(12) United States Patent
Simmonds

(10) Patent No.: US 8,787,503 B2
(45) Date of Patent: Jul. 22, 2014

(54) FREQUENCY MIXER WITH COMPENSATED DC OFFSET CORRECTION TO REDUCE LINEARITY DEGRADATION

(71) Applicant: David Simmonds, Poway, CA (US)

(72) Inventor: David Simmonds, Poway, CA (US)

(73) Assignee: ViXS Systems, Inc., Toronto, Ontario (CA)

(*) Notice: Subject to any disclaimer, the term of this patent is extended or adjusted under 35 U.S.C. 154(b) by 30 days.

(21) Appl. No.: 13/622,014

(22) Filed: Sep. 18, 2012

(65) Prior Publication Data

US 2014/0079157 A1    Mar. 20, 2014

(51) Int. Cl.
*H04L 25/06* (2006.01)

(52) U.S. Cl.
USPC .......................................... 375/319; 375/316

(58) Field of Classification Search
CPC ............ H04B 1/30; H03D 1/22; H04L 25/06
USPC .................................. 375/316–319
See application file for complete search history.

(56) References Cited

U.S. PATENT DOCUMENTS

| | | | | |
|---|---|---|---|---|
| 5,898,912 A * | 4/1999 | Heck et al. | ................. | 455/234.2 |
| 6,175,728 B1 * | 1/2001 | Mitama | ........................ | 455/323 |
| 6,356,217 B1 * | 3/2002 | Tilley et al. | ................... | 341/118 |
| 6,459,889 B1 * | 10/2002 | Ruelke | .......................... | 455/296 |
| 6,535,725 B2 * | 3/2003 | Hatcher et al. | ................ | 455/317 |
| 6,771,720 B1 * | 8/2004 | Yang et al. | .................... | 375/345 |
| 7,130,607 B2 * | 10/2006 | Khorram | ....................... | 455/326 |
| 7,203,476 B2 * | 4/2007 | Ruelke et al. | ................. | 455/324 |
| 7,257,385 B2 * | 8/2007 | Ono et al. | .................. | 455/232.1 |
| 7,359,678 B2 * | 4/2008 | Hayashi et al. | ................. | 455/84 |
| 7,403,751 B2 * | 7/2008 | Irie et al. | ........................ | 455/130 |
| 7,409,199 B2 * | 8/2008 | Igarashi et al. | ............... | 455/296 |
| 7,421,263 B2 * | 9/2008 | Kim | .......................... | 455/234.1 |
| 7,466,193 B2 * | 12/2008 | Kim | ................................. | 330/9 |
| 7,532,874 B2 * | 5/2009 | Muhammad et al. | ....... | 455/278.1 |
| 7,734,273 B2 * | 6/2010 | Komori et al. | ................ | 455/334 |
| 7,912,437 B2 * | 3/2011 | Rahman et al. | ............... | 455/296 |
| 8,112,055 B2 * | 2/2012 | Yang et al. | .................... | 455/296 |
| 2001/0049267 A1 * | 12/2001 | Takalo et al. | ................... | 455/84 |
| 2002/0160740 A1 * | 10/2002 | Hatcher et al. | ................ | 455/317 |
| 2003/0045263 A1 * | 3/2003 | Wakayama et al. | ........... | 455/323 |
| 2003/0119461 A1 * | 6/2003 | Hirano et al. | ................. | 455/118 |
| 2004/0002311 A1 * | 1/2004 | Feng | ......................... | 455/194.2 |
| 2004/0014450 A1 * | 1/2004 | Yamamoto et al. | .......... | 455/307 |
| 2004/0157573 A1 * | 8/2004 | Lee et al. | .................... | 455/197.2 |
| 2004/0229589 A1 * | 11/2004 | Behzad | ......................... | 455/285 |
| 2005/0075088 A1 * | 4/2005 | Ono et al. | .................. | 455/251.1 |
| 2005/0186927 A1 * | 8/2005 | Hayashi et al. | ............. | 455/232.1 |
| 2006/0055573 A1 * | 3/2006 | Carey et al. | .................... | 341/144 |
| 2006/0068746 A1 * | 3/2006 | Feng et al. | ..................... | 455/323 |
| 2006/0073803 A1 * | 4/2006 | Igarashi et al. | ............... | 455/296 |
| 2006/0125543 A1 * | 6/2006 | Hsieh et al. | .................... | 327/307 |

(Continued)

*Primary Examiner* — Emmanuel Bayard
(74) *Attorney, Agent, or Firm* — Abel Law Group, LLP

(57) ABSTRACT

An apparatus includes a frequency mixer circuit configured to generate a baseband signal based on a local oscillator signal and a radio frequency signal. The apparatus includes a compensation circuit configured to generate a DC offset-compensated signal based on the baseband signal, a DC offset compensation signal, and a second signal. The DC offset compensation signal and the second signal have currents approximately equal in magnitude and opposite in direction. A current of the DC offset-compensated signal is substantially the same as a current of the baseband signal. The compensation circuit may include a DC digital-to-analog converter circuit configured to generate the DC offset compensation signal and the second signal based on a control signal.

20 Claims, 5 Drawing Sheets

(56) References Cited

U.S. PATENT DOCUMENTS

| | | | |
|---|---|---|---|
| 2006/0222117 A1* | 10/2006 | Rahman et al. | 375/345 |
| 2006/0258317 A1* | 11/2006 | Watanabe | 455/296 |
| 2007/0109161 A1* | 5/2007 | Shimizu et al. | 341/120 |
| 2007/0153945 A1* | 7/2007 | Gupta | 375/346 |
| 2007/0173220 A1* | 7/2007 | Kim et al. | 455/296 |
| 2007/0202814 A1* | 8/2007 | Ono et al. | 455/78 |
| 2007/0293180 A1* | 12/2007 | Rahman et al. | 455/324 |
| 2008/0026719 A1* | 1/2008 | Chiu et al. | 455/296 |
| 2008/0051051 A1* | 2/2008 | Kral | 455/264 |
| 2008/0119716 A1* | 5/2008 | Boric-Lubecke et al. | 600/407 |
| 2008/0182538 A1* | 7/2008 | Tanaka et al. | 455/234.1 |
| 2009/0135970 A1* | 5/2009 | Miyagi et al. | 375/345 |
| 2009/0225911 A1* | 9/2009 | Elahi et al. | 375/346 |
| 2009/0237283 A1* | 9/2009 | Tu et al. | 341/143 |
| 2009/0258626 A1* | 10/2009 | Yamada et al. | 455/253.2 |
| 2009/0264090 A1* | 10/2009 | Ivonnet et al. | 455/233.1 |
| 2010/0075624 A1* | 3/2010 | Shanan | 455/253.2 |
| 2010/0144303 A1* | 6/2010 | Stogner et al. | 455/296 |
| 2010/0303184 A1* | 12/2010 | Komori | 375/354 |
| 2011/0092175 A1* | 4/2011 | Tanaka et al. | 455/234.1 |
| 2011/0188555 A1* | 8/2011 | Han et al. | 375/224 |
| 2011/0188612 A1* | 8/2011 | Ashkenazi et al. | 375/319 |
| 2011/0201284 A1* | 8/2011 | Ivonnet et al. | 455/78 |
| 2012/0196555 A1* | 8/2012 | Igarashi et al. | 455/341 |
| 2013/0188678 A1* | 7/2013 | Olgaard et al. | 375/224 |

* cited by examiner

FREQUENCY MIXER WITH COMPENSATED DC OFFSET CORRECTION TO REDUCE LINEARITY DEGRADATION

BACKGROUND

1. Field of the Invention

This application is related to communications systems and more particularly to receivers of communications systems.

2. Description of the Related Art

A typical superheterodyne receiver converts a received radio-frequency (RF) signal to an intermediate-frequency (IF) signal. The receiver demodulates the IF signal using synchronous detection driven by a local oscillator having a frequency that is substantially the same as the frequency of the carrier signal for the intended data signal. A typical direct-conversion (i.e., homodyne, synchrodyne, or zero-IF) receiver has a local oscillator frequency that is approximately the same as the frequency of the carrier signal. Mixing in a direct-conversion receiver converts the received RF signal directly to baseband (i.e., zero frequency). That is, a direct-conversion receiver converts a received RF signal to a baseband signal using a single frequency conversion. The typical direct-conversion receiver is less complex than the typical superheterodyne receiver since the direct-conversion receiver requires fewer frequency conversions, eliminates intermediate frequency stages, and reduces image rejection issues. The reduced complexity of direct-conversion receivers results in compact digital signal processing code size, efficient digital signal processing data manipulation, and reduced integrated circuit area.

However, a typical direct-conversion receiver introduces a DC offset into the received signal due to RF and static DC mechanisms. Static DC mechanisms include DC offsets introduced in the mixer and/or amplifiers due to mismatches in device layouts and manufacture. Radio-frequency mechanisms include self-mixing due to pickup of the receiver local oscillator signal at an input of a low-noise amplifier (LNA) and at a frequency mixer input. For example, local oscillator energy may leak through the frequency mixer, feed back to the receiver antenna input, and then re-enter the frequency mixer. As a result, the overall local oscillator energy self-mixes and creates a receiver DC offset signal. The receiver DC offset signal may be large enough to overload any baseband amplifiers and degrade the recovery of an intended data signal. Typical receiver modifications that may reduce the receiver DC offset include high-pass filtering the received signal, which may reduce the realizable throughput of the receiver and increase the complexity of the receiver. The increased complexity is associated with higher production costs that may outweigh the benefits. Accordingly, improved techniques for recovering an intended data signal from an RF signal in a direct-conversion receiver are desired.

SUMMARY OF EMBODIMENTS OF THE INVENTION

In at least one embodiment of the invention, an apparatus includes a frequency mixer circuit configured to generate a baseband signal based on a local oscillator signal and an RF signal. The apparatus includes a compensation circuit configured to generate a DC offset-compensated signal based on the baseband signal, a DC offset compensation signal, and a second signal. The DC offset compensation signal and the second signal have currents approximately equal in magnitude and opposite in direction. A current of the DC offset-compensated signal is substantially the same as a current of the baseband signal. The compensation circuit may include a DC digital-to-analog converter circuit configured to generate the DC offset compensation signal and the second signal based on a control signal. The DC digital-to-analog converter circuit may include a current source configured to source a current, corresponding to the second signal, to a first node based on the control signal. The DC digital-to-analog converter circuit may include a resistor coupled to the first node and a second node. The DC digital-to-analog converter circuit may include a current sink configured to sink a current, corresponding to the DC offset compensation signal, from the second node based on the control signal.

In at least one embodiment of the invention, a method includes generating a baseband signal based on an RF signal and a local oscillator signal. The method includes generating a DC offset-compensated signal based on the baseband signal, a DC offset compensation signal, and a second signal. The DC offset compensation signal and the second signal have currents approximately equal in magnitude and opposite in direction. A current of the DC offset-compensated signal is substantially the same as a current of the baseband signal. The method may include enabling one of a first compensation circuit and a second compensation circuit based on a sign of a DC offset compensation control signal. The method may include disabling the other of the first compensation circuit and the second compensation circuit based on the sign of the DC offset compensation control signal. Generating the DC offset-compensated signal may include sourcing a first current to a first path of a differential path of the baseband signal in response to a first sign of the DC offset compensation control signal. Generating the DC offset-compensated signal may include sinking a second current from the first path in response to the first sign of the DC offset compensation control signal. The second current may have a magnitude approximately equal to a magnitude of the first current. Generating the DC offset-compensated signal may include sourcing a third current to a second path of the differential path of the baseband signal in response to a second sign of the DC offset compensation control signal. Generating the DC offset-compensated signal may include sinking a fourth current from the second path in response to the second sign of the DC offset compensation control signal. The fourth current may have a magnitude approximately equal to a magnitude of the third current.

BRIEF DESCRIPTION OF THE DRAWINGS

The present invention may be better understood by, and its numerous objects, features, and advantages made apparent to, those skilled in the art by referencing the accompanying drawings.

The use of the same reference symbols in different drawings indicates similar or identical items.

DETAILED DESCRIPTION

Figure 1:
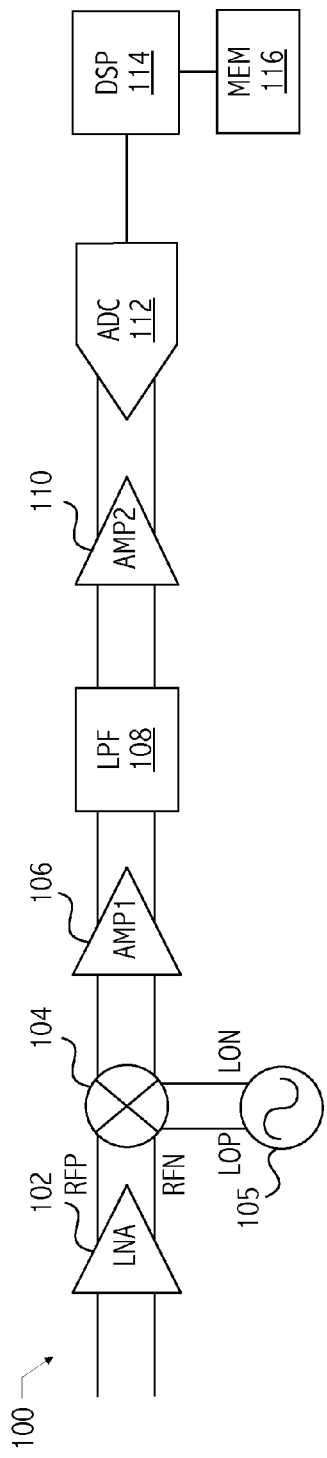
FIG. 1 illustrates a functional block diagram of a typical direct-conversion communications system.

Referring to FIG. 1, direct-conversion receiver 100 receives an RF signal from an RF transmitter over an RF channel, which may be a wireline or wireless channel. Receiver 100 includes low-noise amplifier (LNA) 102 that adjusts the magnitude of a possibly weak received signal into signals having a usable dynamic range. The RF signal is based on a transmit baseband signal that has been frequency-mixed with a transmitter carrier signal having a target frequency. As referred to herein, a baseband signal is a signal before mixing with a carrier signal at a transmitter, a signal before modulation of the carrier signal at the transmitter, or after demodulation of the carrier signal at the receiver, and has a range of frequencies from approximately 0 Hertz (Hz) to a target maximum frequency. The baseband signal may be a multi-carrier modulated signal 102 (e.g., an orthogonal frequency-division multiplexing (OFDM) signal) or other suitable signal. Receiver 100 is a direct-conversion receiver that includes local oscillator 105 and frequency mixer 104 that recovers the baseband signal by frequency mixing the received RF signal with a receiver carrier signal having substantially the same frequency as the transmitter carrier frequency. Subsequent receiver modules, e.g., amplifier 106, low-pass filter 108, and amplifier 110, adjust the spectrum and dynamic range of the received signal for conversion into a digital signal using analog-to-digital converter 112. Receiver 100 recovers data from the digital signal using dedicated processing circuitry and/or a general purpose processor, a digital signal processor (DSP), a specialized processor, or other processor executing code stored in memory 116 or other storage device. For example DSP 114 demodulates the digital signal using a fast-Fourier transform to recover data from an OFDM signal. Note that receiver 100 is exemplary only and may include other modules (e.g., frequency correction stages that correct for frequency offset of the receiver oscillator 105 from a transmitter local oscillator).

In an actual system, RF receiver 100 introduces a receiver DC error component into the baseband multicarrier signal. The net DC offset ($DC_{os}$) introduced into the digital received signal supplied to DSP 114 includes a DC offset voltage component (V) from each block in the receiver signal path multiplied by the gain (G) of a subsequent stage. For example, the net DC offset for the receiver of FIG. 1 may be represented as follows:

$$DC_{os} = (V_{104}+V_{106}) \times [G_{106}+G_{108}+G_{110}] + V_{108}[G_{108}+G_{110}] + V_{110}[G_{110}] + V_{112}.$$

Figure 2:
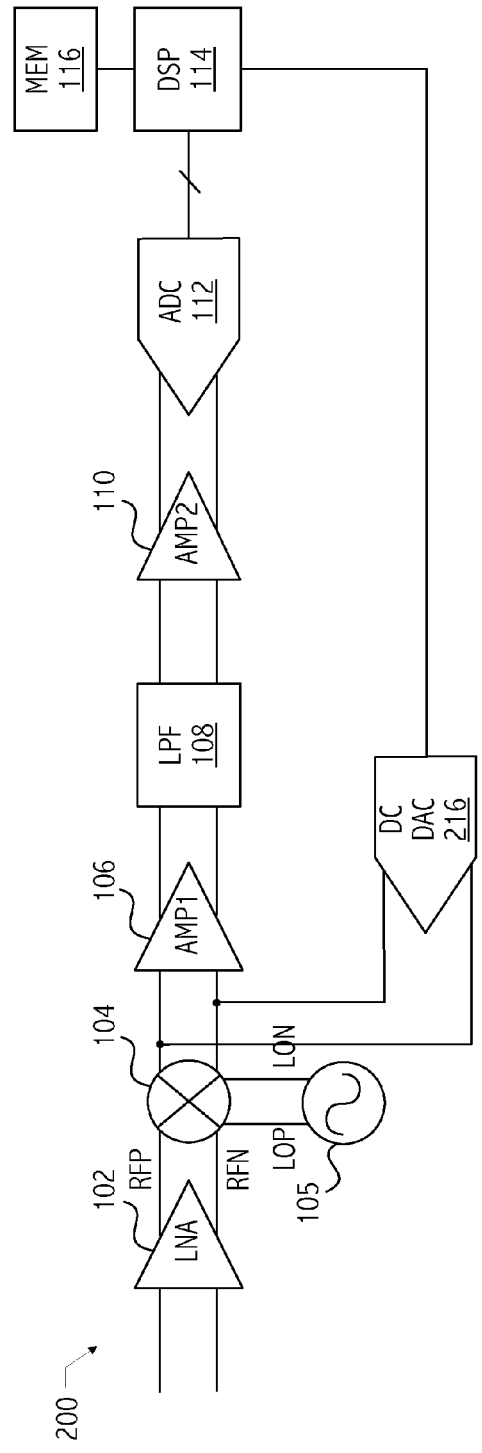
FIG. 2 illustrates a functional block diagram of a typical direct-conversion receiver using digitally-controlled DC offset compensation.

A technique for compensating for the DC offset includes correcting the DC offset at each stage, prior to amplification by a subsequent stage. However, this technique requires several signal injection points and a complex control scheme that solves simultaneous equations with many variables. Another technique for compensating for the DC offset includes using a single injection point. Since frequency mixer 104 is at the beginning of the receiver signal path and its error component is gained by various modules in the receiver signal path, the component introduced by frequency mixer 104 is the dominant component of the total DC offset. Accordingly, a compensating DC offset signal may be injected into the baseband signal at the output of frequency mixer 104, as illustrated by direct-conversion receiver 200 of FIG. 2. Digital signal processor 114 measures the DC offset based on a digital version of the baseband signal and provides a digital control signal that is converted into an analog signal using DC digital-to-analog converter (DAC) 216. The analog DC offset compensation signal is combined with the baseband output of frequency mixer 104 to compensate for the DC offset. The resulting DC offset ($DC_{oscomp}$) of the DC offset-compensated signal may be represented as follows:

$$DC_{oscomp} = (V_{104}+V_{106}+V_{comp}) \times [G_{106}+G_{108}+G_{110}] + V_{108}[G_{108}+G_{110}] + V_{110}[G_{110}] + V_{112}.$$

Figure 5:
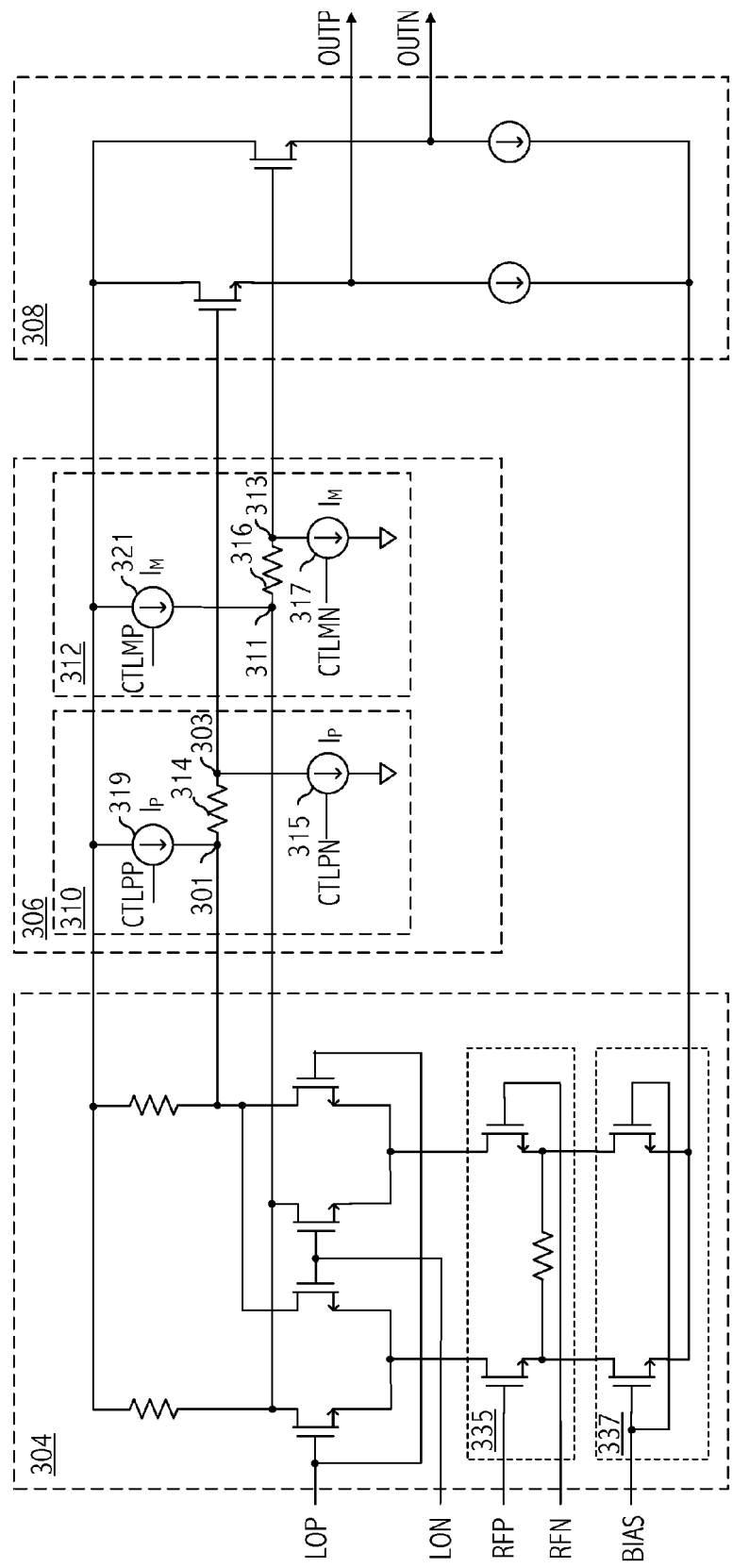
FIG. 5 illustrates a circuit diagram of a frequency mixer and DC offset compensation modules consistent with at least one embodiment of the invention.

A typical frequency mixer is designed to have a particular second-order input intercept point (IIP2), which is a measure of linearity that quantifies the second-order distortion generated by the frequency mixer, which is a non-linear module. At low power levels, the fundamental output power rises in a one-to-one ratio (in dB) of the input power, while second-order output power rises in a two-to-one ratio. The second-order intercept point is the output power point at which extrapolated first-order and second-order lines intersect on a plot, since actual power levels typically flatten out due to saturation. To determine the second-order characteristics of a particular module, a strong signal is transferred through the module and the outputs are measured. Thus, injection of a DC compensation current at the frequency mixer may change the IIP2 of the mixer. For example, frequency mixer 104 frequency mixes a differential local oscillator signal, LOP and LON, with a differential received RF signal, RFP and RFN. Referring to FIG. 5, an exemplary frequency mixer 304 includes current sources 337 which use a bias signal, gain stage 335, and a switching stage. Injection of a DC compensation current at the frequency mixer may unbalance DC bias currents between positive and negative branches of the frequency mixer, while trying to compensate for DC offset in a separate module. The resulting imbalance can cause second-order non-linearities that result in unwanted tones in the baseband OFDM signal and degrade the IIP2 associated with the frequency mixer.

Figure 3:
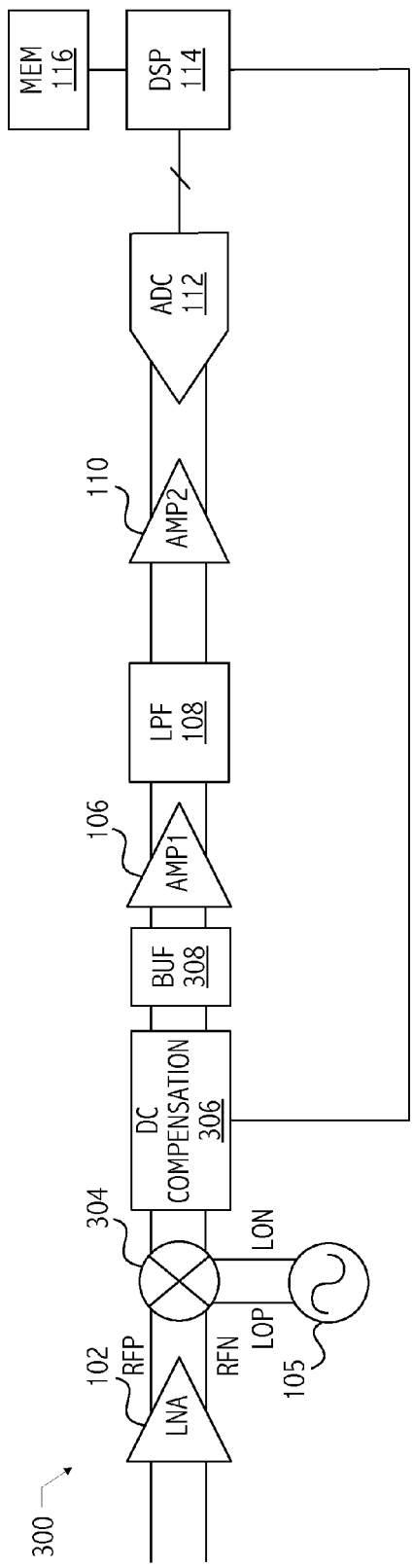
FIG. 3 illustrates a functional block diagram of a direct-conversion communications system using DC offset compensation consistent with at least one embodiment of the invention.
Figure 4:
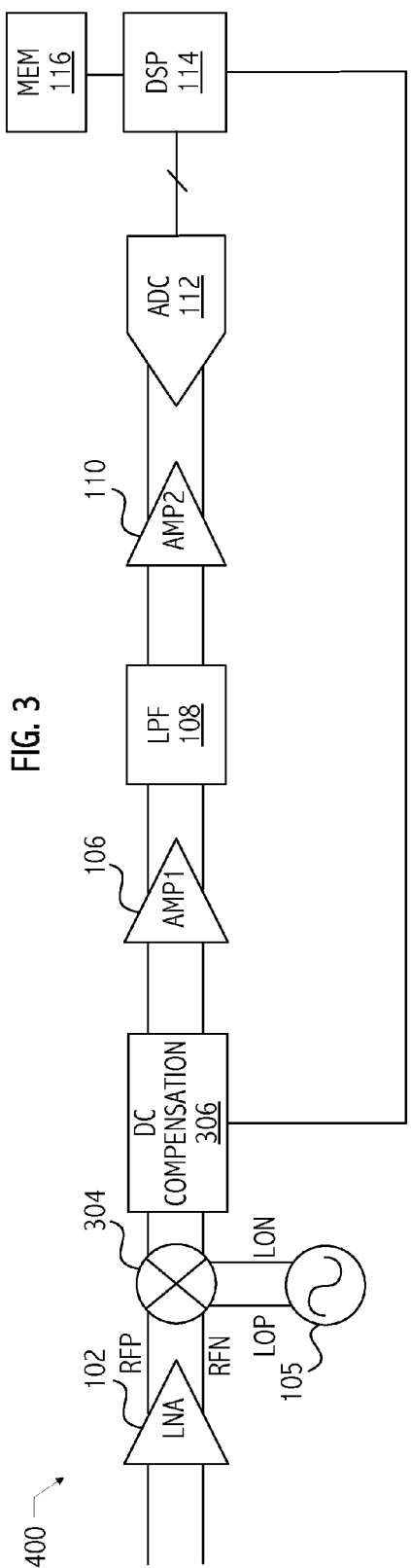
FIG. 4 illustrates a functional block diagram of a direct-conversion communications system using DC offset compensation consistent with at least one embodiment of the invention.

Referring to FIGS. 3 and 4, DC offset compensation module 306 compensates for a DC offset in the baseband signal generated by frequency mixer 304 without substantially changing a second-order input intercept point of frequency mixer 304. Digital signal processor 114 generates a DC offset compensation control signal by rectifying a signal received from ADC 112, determining a DC level of the rectified signal, integrating the DC level over a predetermined time interval, and providing one or more control signals to DC offset compensation module 306, based thereon. Other techniques for generating the DC offset compensation control signal include stepping through DC offset compensation values either sequentially or in a successive approximation manner and using an analog comparator to detect a change in sign of the baseband signal. The DC offset compensation signal may be generated at power-up of the integrated circuit and/or dynamically adjusted periodically using one or more packets of a signal. In at least one embodiment, RF receiver 300 includes buffer 308 that provides an isolation function and provides differential output signal OUTP and OUTN to subsequent receiver modules. Buffer 308 has a high-impedance input and a low-impedance output and is coupled between DC offset compensation module 306 and amplifier 106. FIG. 4 illustrates other embodiments of an RF receiver that incorporate the functions of a buffer module into frequency mixer 304.

Figure 6:
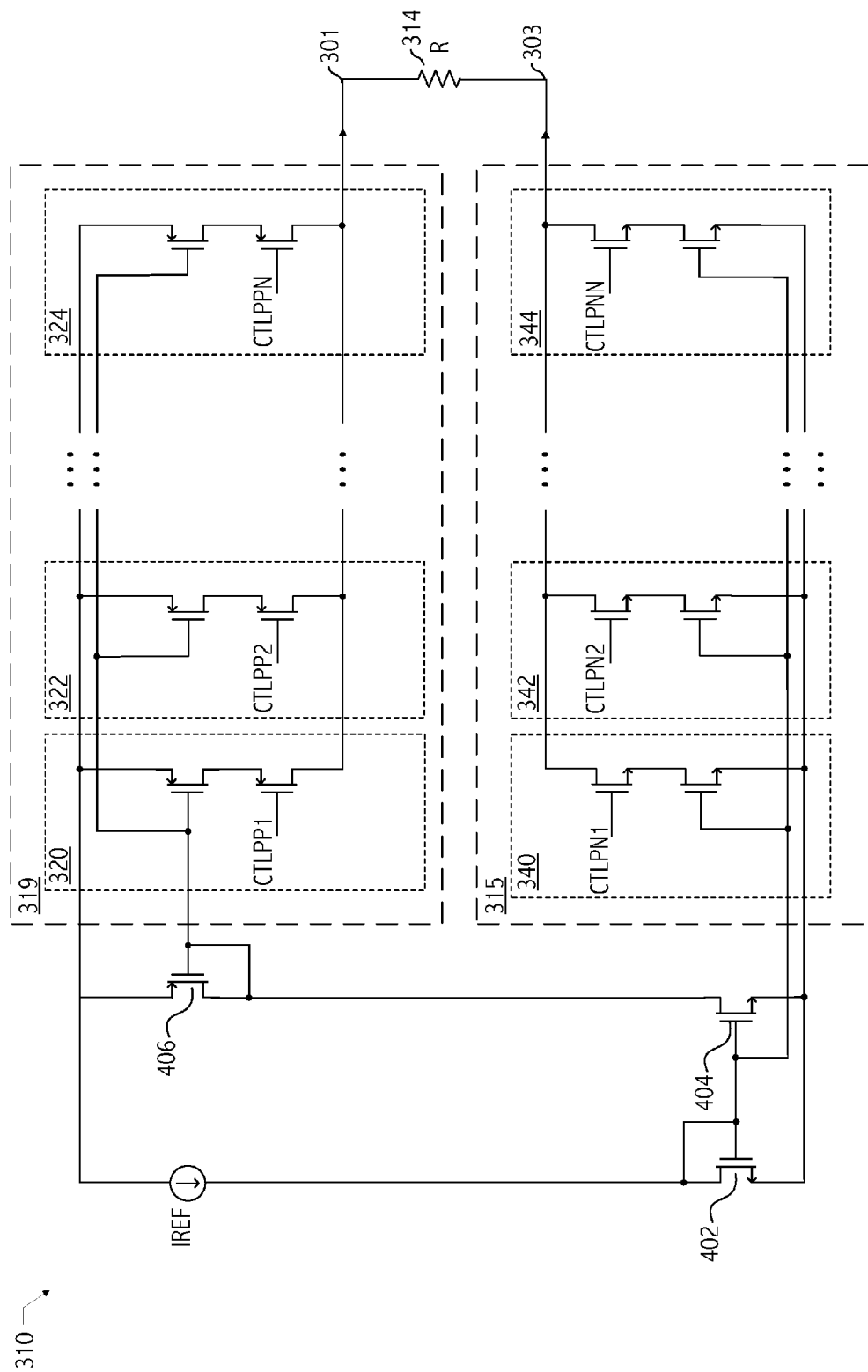
FIG. 6 illustrates a circuit diagram of an exemplary compensation circuit 310 of FIG. 5 consistent with at least one embodiment of the invention.
Figure 7:
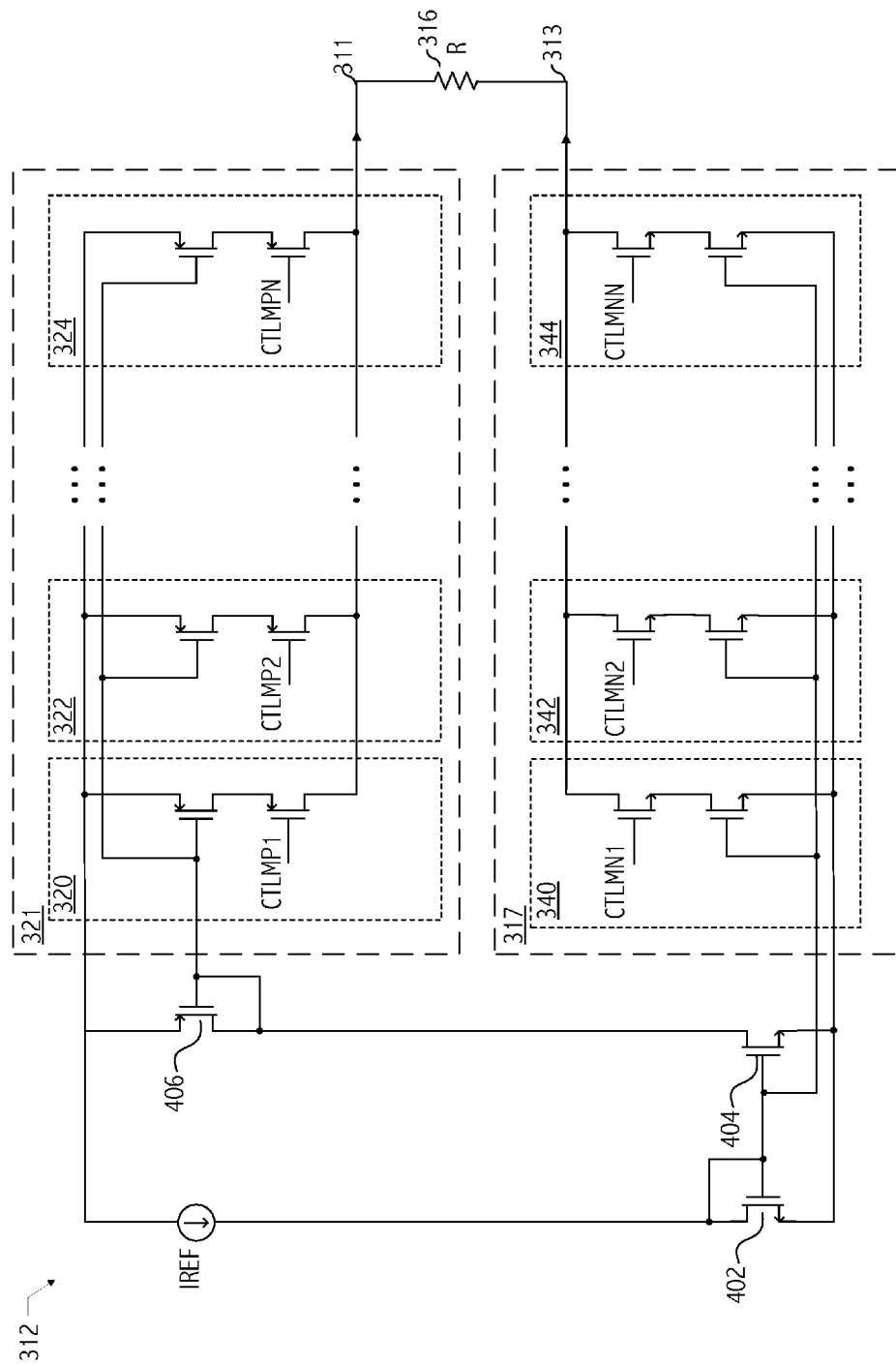
FIG. 7 illustrates a circuit diagram of an exemplary compensation circuit 312 of FIG. 5 consistent with at least one embodiment of the invention.

Referring to FIG. 5, DC offset compensation module 306 includes a compensation module for each branch of a differential circuit embodiment of frequency mixer 304. Compensation module 310 generates a DC offset voltage to be applied to the positive branch of the differential receiver signal path, and compensation module 312 generates a DC offset voltage to be applied to the negative branch of the differential receiver signal path. DC offset compensation module 306 applies a current ($I_p$ and/or $I_m$) to generate a voltage drop across a resistor located between an output of frequency mixer 304 and buffer 308 (or other subsequent stage of the receiver path). The two n-type current sources (current sources 315 and 317) alone could be used to pull current through resistor 314 or resistor 316, respectively, and create either a positive or negative differential voltage, but this would cause currents in resistor 314 and resistor 316 to become imbalanced. Referring to FIGS. 5-7, a technique for injecting a DC compensation current at the frequency mixer without substantially degrading the linearity of the frequency mixer (e.g., IIP2 of the frequency mixer) includes simultaneously applying a second current that has a magnitude equal to the magnitude of the DC compensation current but flows in an opposite direction. The second current reduces a net current flow for DC offset compensation from the frequency mixer to approximately zero, thereby reducing or eliminating any resulting imbalance of frequency mixer 304. If frequency mixer 304 is not substantially unbalanced, then the IIP2 of frequency mixer 304 is not substantially degraded. To prevent significant imbalance in frequency mixer current through resistor 314 and resistor 316, p-type current sources 319 and 321 are included to provide a compensating current having the same magnitude as a current generated by corresponding n-type current sources 315 and 317, respectively.

Each compensation module 310 and 312 includes a resistor and two current sources that generate currents that are substantially equal in magnitude but flow in opposite directions with respect to the receiver path to generate the DC offset compensation voltage without a substantial net compensation current flow from frequency mixer 304. If the compensation technique introduces no substantial current flow to/from frequency mixer 304, the DC offset compensation does not substantially affect the IIP2 associated with frequency mixer 304. For example, current sources 315 and 317, which include n-type devices, pull current through resistors 314 and 316, respectively, and create a positive or negative differential DC offset compensation voltage. To prevent a substantial imbalance in mixer current that flows through resistors 314 and 316, current sources 319 and 321, including p-type devices, are coupled to resistors 314 and 316, respectively. The currents provided by current sources 319 and 321 have substantially the same magnitude as the currents generated by current sources 315 and 317, respectively, but with a different polarity. That is, the currents generated by sources 319 and 321 flow in an opposite direction with respect to the receiver signal path as compared to the direction with respect to the receiver signal path of currents generated by sources 315 and 317.

Referring to FIG. 6, compensation module 310 includes resistor 314 coupled between nodes 301 and 303 in the receiver signal path, which are coupled to current sources 319 and 315, respectively. Current sources 319 and 315 generate currents having equal magnitudes and opposite directions with respect to the receiver signal path by selectively enabling individual current mirrors according to control signals CTLPPn and CTLPNn, respectively, where n=1, 2, ..., N. Current sources 319 and 315 include p-type and n-type current sources, respectively, arranged so that a current out of p-type sources is matched to a current into n-type sources. Ideally, those currents have identical magnitudes, but practical circuit design and fabrication limitations result in currents that have substantially equal magnitudes, i.e., magnitudes that are equal within some tolerance level (e.g., within approximately 1%).

Still referring to FIG. 6, current source 315 includes n-type current mirrors that generate currents using a reference current (IREF), mirror elements 340, 342, ..., 344, and device 402. Individual mirror elements provide a mirrored version of IREF according to control bits CTLPN1, CTLPN2, ..., CTLPNN. Mirror elements 340, 342, ..., 344 may be unit elements that generate currents of the same magnitude. In other embodiments, mirror elements 340, 342, ..., 344 are weighted elements that generate currents of different magnitudes. For example, N mirror elements may be binary-weighted to generate currents of increasing magnitude (e.g., $UI \times 2^{n-1}$, where UI is a unit current and n=1, 2, 4, 8, ..., $2^{N-1}$). In at least one embodiment of compensation circuit 310, CTLPN1, CTLPN2, ..., CTLPNN are thermometer-coded control signals that are generated based on a DC offset compensation control signal, CTLPN, received from DSP 114 of FIG. 4. In yet other embodiments, current source 315 uses a segmented DAC architecture, which includes a combination of unit elements and binary weighted elements.

Referring back to FIG. 6, current source 319 includes p-type current mirrors that generate currents using IREF, mirror elements 320, 322, ..., 324, device 402, device 404, and device 406. Individual mirror elements provide a mirrored version of IREF according to control bits CTLPP1, CTLPP2, ..., CTLPPN. Mirror elements 320, 322, ..., 324 may be unit elements that generate currents of the same magnitude. In other embodiments, mirror elements 320, 322, ..., 324 are weighted elements that generate currents of different magnitudes. For example, N mirror elements may be binary-weighted to generate currents of increasing magnitude (e.g., $UI \times 2^{n-1}$, where UI is a unit current and n=1, 2, 4, 8, ..., $2^{N-1}$). In at least one embodiment of compensation circuit 310, CTLPP1, CTLPP2, ..., CTLPPN are thermometer-coded control signals that are generated based on a DC offset compensation control signal, CTLPP, received from DSP 114 of FIG. 4. In yet other embodiments, current source 319 uses a segmented DAC architecture, which includes a combination of unit elements and binary weighted elements.

Referring back to FIG. 5, compensation module 312 is similar to compensation module 310 but is separately controlled to provide a DC offset voltage on a different branch of frequency mixer 304. Referring to FIG. 7, compensation circuit 312 includes resistor 316 coupled to nodes 311 and 313 in the receiver signal path and current sources 321 and 317, which generate currents having equal magnitudes and opposite directions with respect to the receiver signal path by selectively enabling individual current mirrors according to control signals CTLMPn and CTLMNn, respectively, where n=1, 2, ..., N. Current sources 321 and 317 include p-type and n-type current sources, respectively, arranged so that a current out of the p-type current sources is matched to a current into the n-type current sources. Ideally, those currents would have identical magnitudes, but practical circuit design and fabrication limitations result in currents that have substantially equal magnitudes, i.e., magnitudes that are equal within some tolerance level (e.g., within approximately 1%).

Still referring to FIG. 7, current source 317 includes n-type current mirrors that generate currents using a reference current (IREF), mirror elements 340, 342, ..., 344, and device 402. Individual mirror elements provide a mirrored version of IREF according to control bits CTLMN1, CTLMN2, ..., CTLMNN. Mirror elements 340, 342, ..., 344 may be unit elements that generate currents of the same magnitude. In other embodiments, mirror elements 340, 342, ..., 344 are weighted elements that generate currents of different magnitudes. For example, N mirror elements may be binary-weighted to generate currents of increasing magnitude (e.g., $UI \times 2^{n-1}$, where UI is a unit current and $n=1, 2, 4, 8, \ldots, 2^{N-1}$). In at least one embodiment of compensation circuit 312, CTLMN1, CTLMN2, ..., CTLMNN are thermometer-coded control signals that are generated based on DC offset compensation control signals CTLMN received from DSP 114 of FIG. 4. In yet other embodiments, current source 317 uses a segmented DAC architecture, which includes a combination of unit elements and binary weighted elements.

Referring back to FIG. 7, current source 321 includes p-type current mirrors that generate currents using IREF, mirror elements 320, 322, ..., 324, device 402, device 404, and device 406. Individual mirror elements provide a mirrored version of IREF according to control bits CTLMP1, CTLMP2, ..., CTLMPN. Mirror elements 320, 322, ..., 324 may be unit elements that generate currents of the same magnitude. In other embodiments, mirror elements 320, 322, ..., 324 are weighted elements that generate currents of the different magnitudes. For example, N mirror elements may be binary-weighted to generate currents of increasing magnitude (e.g., $UI \times 2^{n-1}$, where UI is a unit current and $n=1, 2, 4, 8, \ldots, 2^{N-1}$). In at least one embodiment of compensation circuit 310, CTLMP1, CTLMP2, ..., CTLMPN are thermometer-coded control signals that are generated based on DC offset compensation control signal CTLMP received from DSP 114 of FIG. 4. In yet other embodiments, current source 321 uses a segmented DAC architecture, which includes a combination of unit elements and binary weighted elements.

Referring back to FIG. 5, note that although the invention is described in an implementation where current sources 315 and 317 are n-type current sources that generate currents of a first polarity (sink current from nodes 303 and 313, respectively) and current sources 319 and 321 are p-type current sources that generate currents of a second polarity (source currents to nodes 301 and 311, respectively), other embodiments of the DC offset compensation module may use current source 315 coupled to node 301, current source 319 coupled to node 303, current source 317 coupled to node 311, and current source 321 coupled to node 313. In addition, other circuit designs may be used to implement those current sources. Thus, techniques for reducing or eliminating effects of a DC offset in a direct-conversion receiver have been disclosed.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test, or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described with differential receiver embodiments that include compensation modules 310 and 312, one of skill in the art will appreciate that the teachings herein can be utilized with single-ended receiver embodiments that may include one or more compensation modules. In addition, although the invention has been described using a conventional Gilbert mixer, other embodiments of the invention use a passive-operational transconductance amplifier or other suitable mixer circuit. Variations and modifications of the embodiments disclosed herein may be made based on the description set forth herein without departing from the scope and spirit of the invention as set forth in the following claims.

What is claimed is:

1. An apparatus comprising:
    a frequency mixer circuit configured to generate a baseband signal based on a local oscillator signal and a radio frequency signal; and
    a compensation circuit configured to generate a DC offset-compensated signal based on the baseband signal, a DC offset compensation signal, and a second signal, the DC offset compensation signal and the second signal having currents approximately equal in magnitude and opposite in direction, a current of the DC offset-compensated signal being substantially the same as a current of the baseband signal.

2. The apparatus, as recited in claim 1, wherein the DC offset compensation signal and the second signal introduce equal and opposite currents to the baseband signal.

3. The apparatus, as recited in claim 1, wherein the DC offset compensation signal and the second signal are based on a control signal, the apparatus further comprising:
    a processor circuit configured to generate the control signal based on a digital version of the baseband signal.

4. The apparatus, as recited in claim 1, wherein the compensation circuit comprises a DC digital-to-analog converter circuit configured to generate the DC offset compensation signal and the second signal based on a control signal.

5. The apparatus, as recited in claim 4, wherein the DC digital-to-analog converter circuit comprises:
    a current source configured to source a current, corresponding to the second signal, to a first node based on the control signal;
    a resistor coupled to the first node and a second node; and
    a current sink configured to sink a current, corresponding to the DC offset compensation signal, from the second node based on the control signal.

6. The apparatus, as recited in claim 1, further comprising:
    a first differential node coupled to an output of the frequency mixer circuit and the input of the compensation circuit,
    a second differential node coupled to the output of the compensation circuit,
    wherein the compensation circuit comprises:
        a first compensation circuit configured to provide the DC offset compensation signal to a first node of the second differential node in response to the control signal indicating a positive DC offset compensation voltage and configured to be disabled otherwise; and a second compensation circuit configured to provide the DC offset compensation signal to a second node of the second differential node in response to the control signal indicating a negative DC offset compensation voltage and configured to be disabled otherwise.

7. The apparatus, as recited in claim 6, wherein the first compensation circuit comprises:
   a first current source configured to source a current to a third node of the first differential node based on the control signal;
   a first resistor coupled to the first node and the third node; and
   a first current sink configured to sink a current from the first node based on the control signal, and
wherein the second compensation circuit comprises:
   a second current source configured to source a current to a fourth node of the first differential node based on the control signal;
   a second resistor coupled to the second node and the fourth node; and
   a second current sink configured to sink a current from the second node based on the control signal.

8. The apparatus, as recited in claim 7, wherein the first current sink and the first current source are configured to generate first currents corresponding to the DC offset compensation signal and the second signal, respectively, in response to a positive value of the control signal, and are disabled in response to a negative value of the control signal,
wherein the second current sink and the second current source are configured to generate second currents corresponding to the DC offset compensating signal and the second signal, respectively in response to the negative value of the control signal, and are disabled in response to a positive value of the control signal, and
wherein magnitudes of the first and second currents are based on the control signal.

9. The apparatus, as recited in claim 1, wherein a second-order input intercept point of the mixer circuit is substantially unchanged by the DC offset compensation circuit.

10. The apparatus, as recited in claim 1, wherein the compensation circuit is directly connected to the frequency mixer circuit.

11. The apparatus, as recited in claim 1, wherein the means for compensating is directly connected to the frequency mixer circuit.

12. A method comprising:
   generating a baseband signal based on a radio frequency signal and a local oscillator signal; and
   generating a DC offset-compensated signal based on the baseband signal, a DC offset compensation signal, and a second signal, the DC offset compensation signal and the second signal having currents approximately equal in magnitude and opposite in direction, a current of the DC offset-compensated signal being substantially the same as a current of the baseband signal.

13. The method, as recited in claim 12, further comprising:
   enabling one of a first compensation circuit and a second compensation circuit based on a sign of a DC offset compensation control signal; and
   disabling the other of the first compensation circuit and the second compensation circuit based on the sign of the DC offset compensation control signal.

14. The method, as recited in claim 12, wherein generating the DC offset-compensated signal comprises:
   sourcing a first current to a first path of a differential path of the baseband signal in response to a first sign of the DC offset compensation control signal; and
   sinking a second current from the first path in response to the first sign of the DC offset compensation control signal, the second current having a magnitude approximately equal to a magnitude of the first current.

15. The method, as recited in claim 14, wherein generating the DC offset-compensated signal further comprises:
   determining a magnitude of the first current based on the DC offset compensation control signal.

16. The method, as recited in claim 14, wherein generating the DC offset-compensated signal further comprises:
   sourcing a third current to a second path of the differential path of the baseband signal in response to a second sign of the DC offset compensation control signal; and
   sinking a fourth current from the second path in response to the second sign of the DC offset compensation control signal, the fourth current having a magnitude approximately equal to a magnitude of the third current.

17. The method, as recited in claim 16, wherein generating the DC offset-compensated signal comprises:
   determining a magnitude of the third current based on the DC offset compensation control signal.

18. The method, as recited in claim 12, wherein a second-order input intercept point of a mixer circuit generating the baseband signal is substantially unchanged by the DC offset compensation circuit.

19. The method, as recited in claim 12, further comprising:
   generating the DC offset compensation signal based on a digital version of the DC offset-compensated signal.

20. An apparatus comprising:
   a mixer circuit; and
   means for compensating for a DC offset in a baseband signal of a receiver path including the mixer circuit by introducing a DC offset voltage and zero net current into the baseband signal.

* * * * *